(12) United States Patent
Buhl et al.

(10) Patent No.: US 10,232,449 B2
(45) Date of Patent: Mar. 19, 2019

(54) COMBINATION TOOL

(71) Applicant: Western New England University, Springfield, MA (US)

(72) Inventors: Eric Buhl, Pittsfield, MA (US); Justin Carbonaro, Georgetown, MA (US); Terrance Crocker, Reading, MA (US); Andrew Egerton, Staatsburg, NY (US); Ashley Rucki, Westfield, MA (US); Glenn E. Vallee, Westbrook, CT (US); Robert T. T. Gettens, Longmeadow, MA (US); James C. McKeon, Longmeadow, MA (US)

(73) Assignee: WESTERN NEW ENGLAND UNIVERSITY, Springfield, MA (US)

( * ) Notice: Subject to any disclaimer, the term of this patent is extended or adjusted under 35 U.S.C. 154(b) by 820 days.

(21) Appl. No.: 14/694,809

(22) Filed: Apr. 23, 2015

(65) Prior Publication Data
US 2015/0352644 A1 Dec. 10, 2015

Related U.S. Application Data

(60) Provisional application No. 62/008,642, filed on Jun. 6, 2014.

(51) Int. Cl.
*B23B 45/00* (2006.01)
*B25F 1/00* (2006.01)
*B25D 1/04* (2006.01)

(52) U.S. Cl.
CPC .............. *B23B 45/001* (2013.01); *B25D 1/04* (2013.01); *B25F 1/006* (2013.01)

(58) Field of Classification Search
CPC .......... B23B 45/001; B25D 1/04; B25D 1/00; B25F 1/006; B25F 1/00
See application file for complete search history.

(56) References Cited

U.S. PATENT DOCUMENTS 4,268,927 A * 5/1981 Bridwell .................. B25D 5/00
30/367

\* cited by examiner

*Primary Examiner* — David Bryant
*Assistant Examiner* — Nirvana Deonauth
(74) *Attorney, Agent, or Firm* — Cantor Colburn LLP (57) ABSTRACT

A multipurpose tool is provided. The tool including a housing having a first end and an opposing second end. A hammer portion extending from the first end, the hammer portion having at least one surface configured to strike a fastener in operation. The tool further includes a drill portion slidably disposed within the housing, the drill portion including a chuck configured to receive a drill, the chuck being positioned within the housing when in a first position and at least partially extending from the second end when in a second position.

15 Claims, 12 Drawing Sheets

COMBINATION TOOL

BACKGROUND OF THE INVENTION

The subject matter disclosed herein relates to a tool and in particular to a tool capable of performing multiple tasks.

Tools are used in a wide variety of applications to assist user in performing a task, such as attaching wooden trim to a wall for example. In some cases multiple tools may be required to perform a given task. For example, it is not uncommon to drill a hole in a piece of wood prior to attaching it with a nail or screw. To accomplish this task, the user needs at least two tools, a powered electric drill and a hammer or screwdriver. When installing a large amount of trim, the user may have to repeatedly pick up and put down multiple tools. As a result, the task may take the user longer to perform due to the switching of tools and finding misplaced tools.

Accordingly, while existing tools are suitable for their intended purposes the need for improvement remains, particularly in providing a multipurpose tool that can accomplish multiple tasks.

BRIEF DESCRIPTION OF THE INVENTION

According to one aspect of the invention, a tool is provided. The tool includes a housing having a first end and an opposing second end. A hammer portion extends from the first end, the hammer portion having at least one surface configured to strike a fastener in operation. A drill portion is slidably disposed within the housing, the drill portion including a chuck configured to receive a drill, the chuck being positioned within the housing when in a first position and at least partially extending from the second end when in a second position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention have advantages in providing a multipurpose tool that can be used to both drill holes in materials and also be used to drive a fastener. Embodiments of the present invention also provide for a drill portion that is retractably attached to the tool to allow the drill bit to be extended in use and withdrawn inside the tool when a hammer portion is used. Embodiments of the invention provide still further advantages of automatically activating the drill when the drill portion is moved to an extended position.

Figure 1:
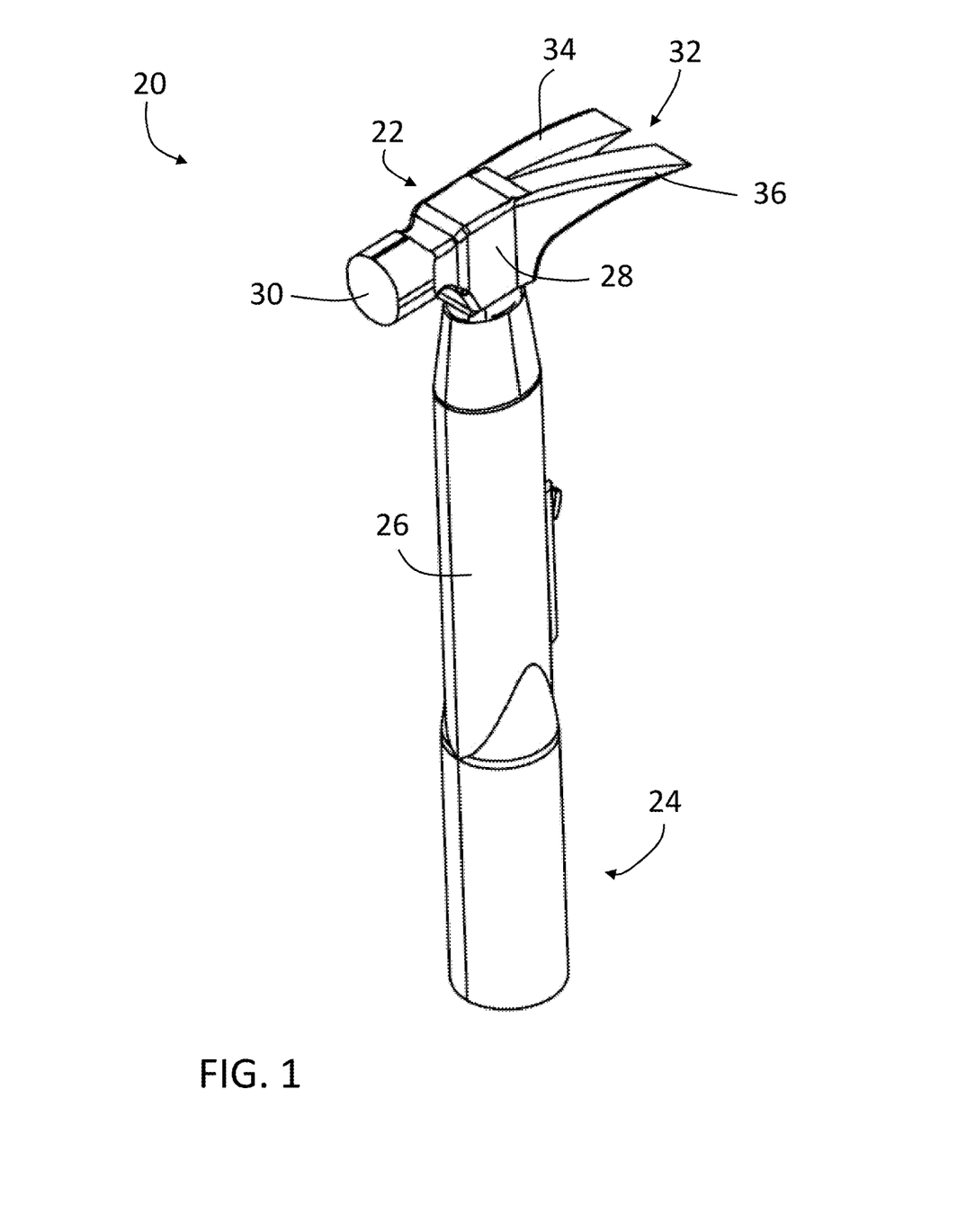
FIG. 1 is a perspective view of a tool in accordance with an embodiment of the invention.
Figure 2:
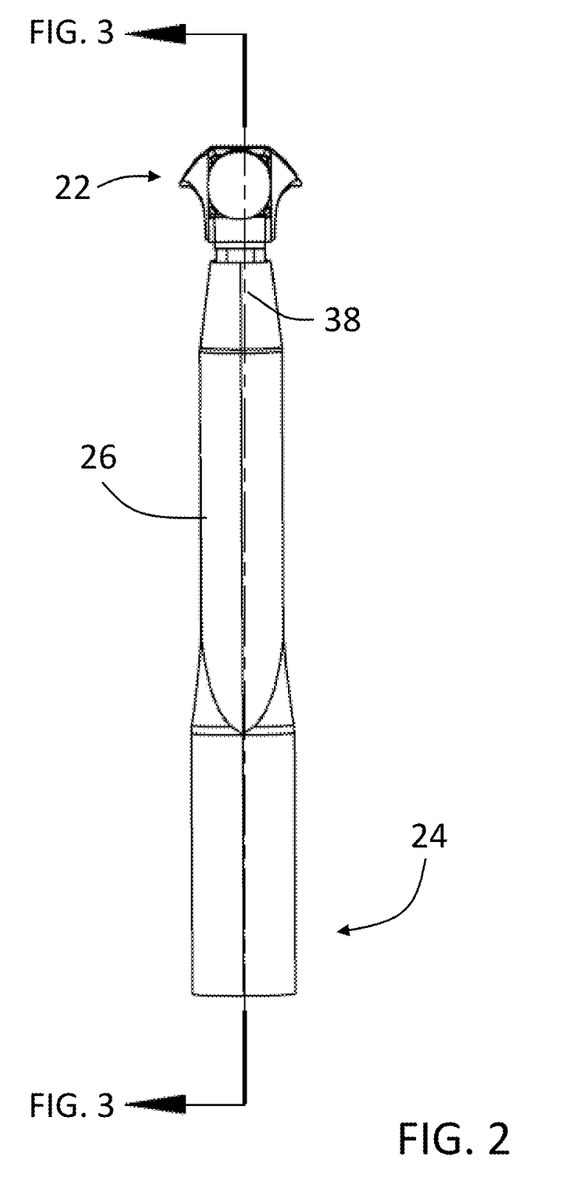
FIG. 2 is a front view of the tool of FIG. 1.
Figure 3:
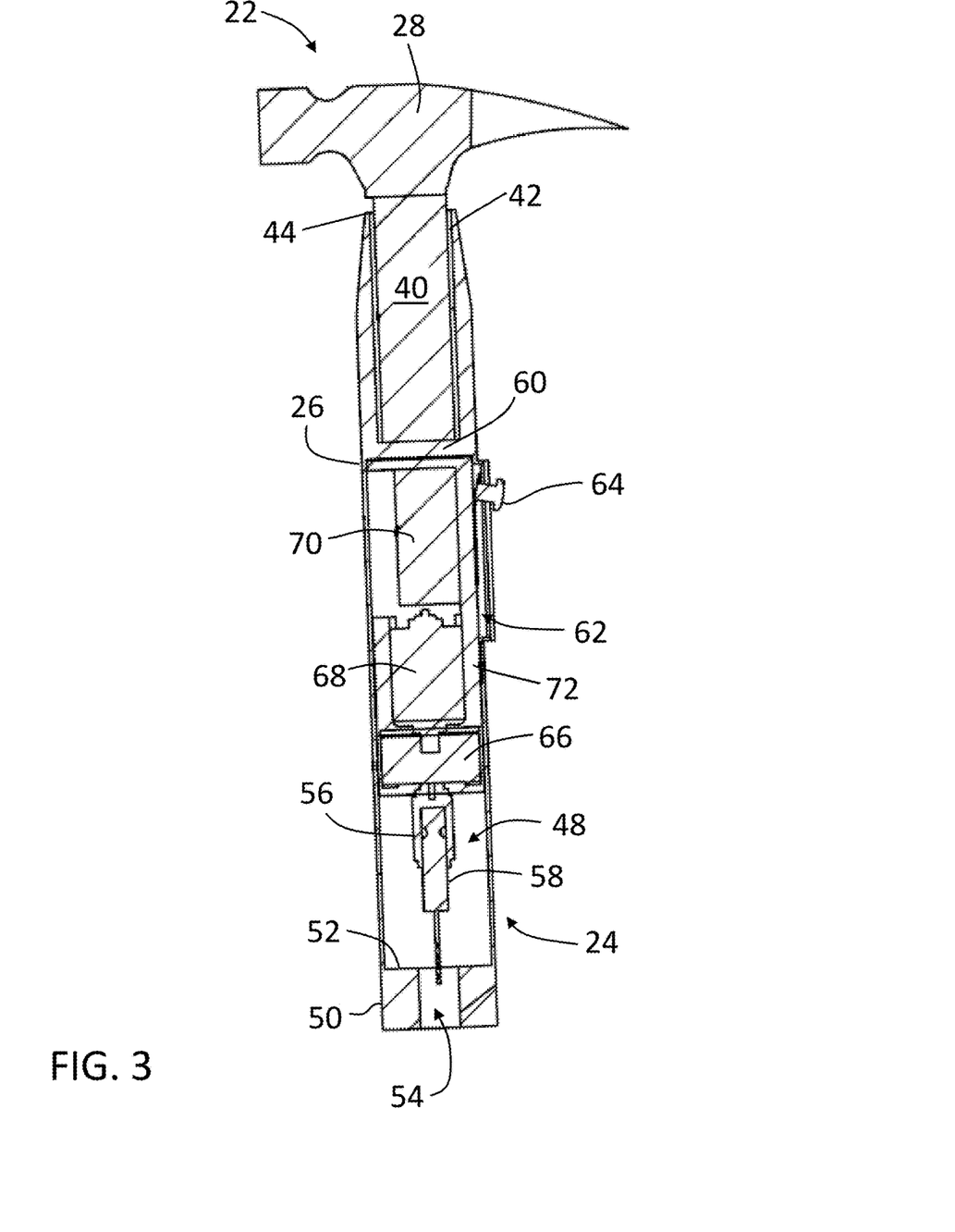
FIG. 3 is a side sectional view of the tool of FIG. 1.

Referring now to FIGS. 1-3, a tool 20 is shown having a hammer portion 22 and a drill portion 24. The tool 20 includes a housing 26 that the hammer portion 22 is mounted to and also encloses the operating components of drill portion 24. In the exemplary embodiment the hammer portion 22 includes a head 28 with a striking surface 30 on one end and a claw 32 on an opposing end. The striking surface 30 is generally circular and is arranged generally perpendicular to the longitudinal axis 38 of the tool 20. The claw 32 includes a pair of arms 34, 36 that may be used to remove a fastener, such as a nail, from a work surface (not shown). In the exemplary embodiment, the arms 34, 36 are curved.

The hammer portion may also have a shaft member 40 (FIG. 3) extending from one side of the head 28. The shaft 40 is received within an opening 42 in a first end 44 of the housing 26. In one embodiment, the shaft 40 is coupled to the housing by bolts 46 (FIG. 15) that extend through the housing 26 and shaft 40. In other embodiments, the shaft is coupled to the opening 42 by other fastening means, such as but not limited to adhesives for example.

In one embodiment, the housing 26 includes a generally hollow interior portion 48. The interior portion 48 is defined on a second end 50 of the housing by a wall 52. The wall 52 has an opening 54 that is sized to allow a chuck 56 and a drill bit 58 to extend therethrough during operation. An opposing end of the interior portion 48 is defined by a wall 60 disposed between the interior portion 48 and the opening 42. A slot 62 extends through a sidewall of the housing 26. As will be discussed in more detail below, an actuator 64 extends through the slot 62 to allow the user to move the drill portion 24 between stored and operating positions.

Arranged within the interior portion 48 are the operating components of the drill portion 24. In the exemplary embodiment, the drill portion 24 is slidably disposed within the interior portion 48. The drill portion is movable between a first or stored position (FIG. 3) and a second or operating position (not shown). When in the second position, the chuck 56 extends through the opening 54. The drill portion 24 is moved when the user slides the actuator 64 axially within the slot 62.

Figure 4A:
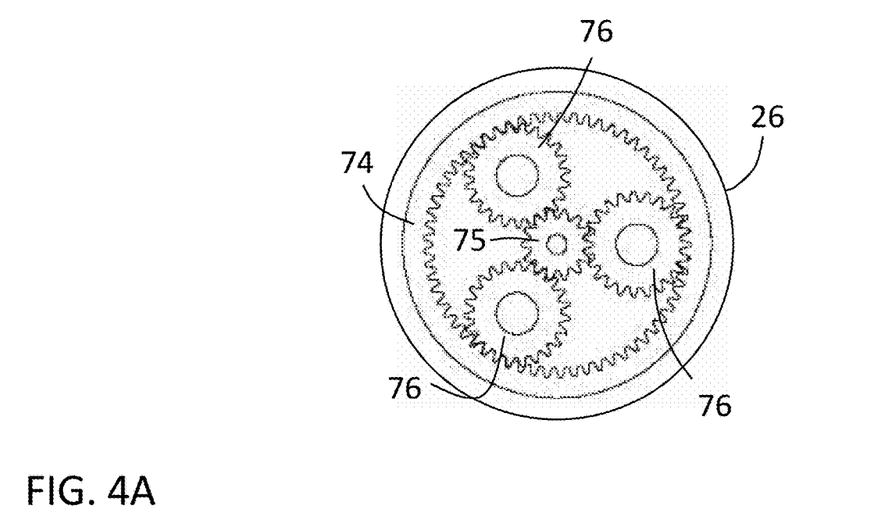
FIGS. 4A and 4B are views of a carriage portion of a gear box for use with the tool of FIG. 1.
Figure 4B:
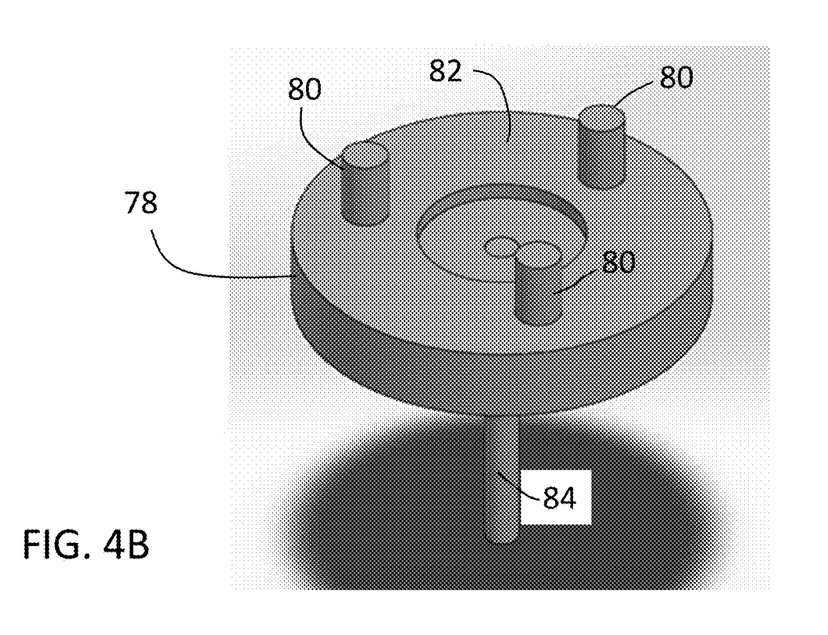
Figure 5:
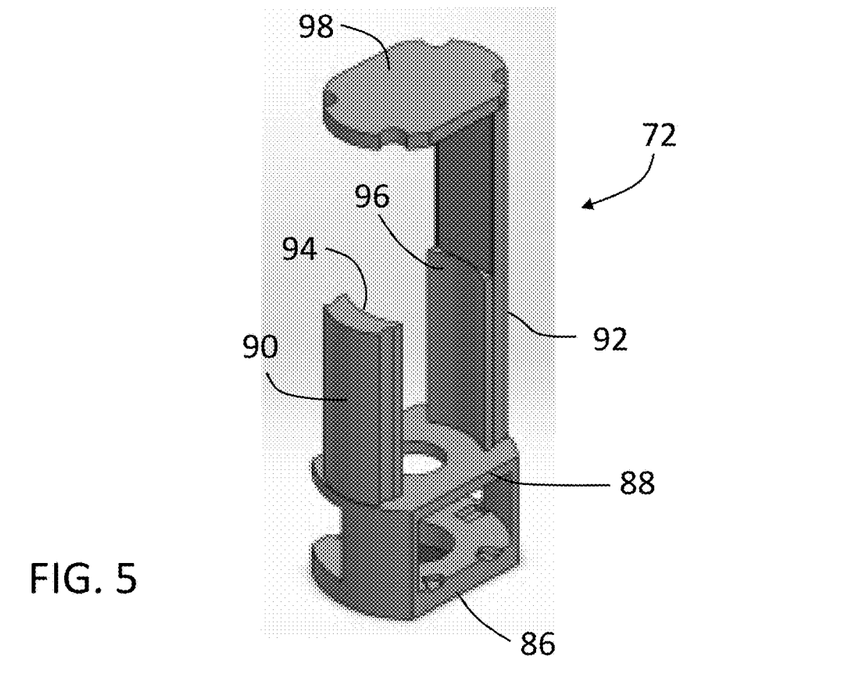
FIG. 5 is a perspective view of a drill frame for use with the tool of FIG. 1 in accordance with an embodiment.
Figure 6:
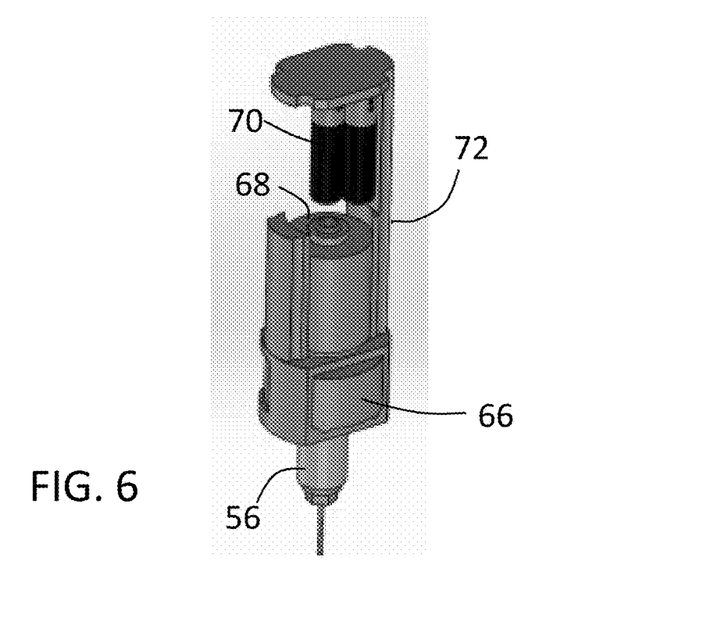
FIG. 6 is a perspective view of a drill assembly including the frame of FIG. 6.
Figure 7:
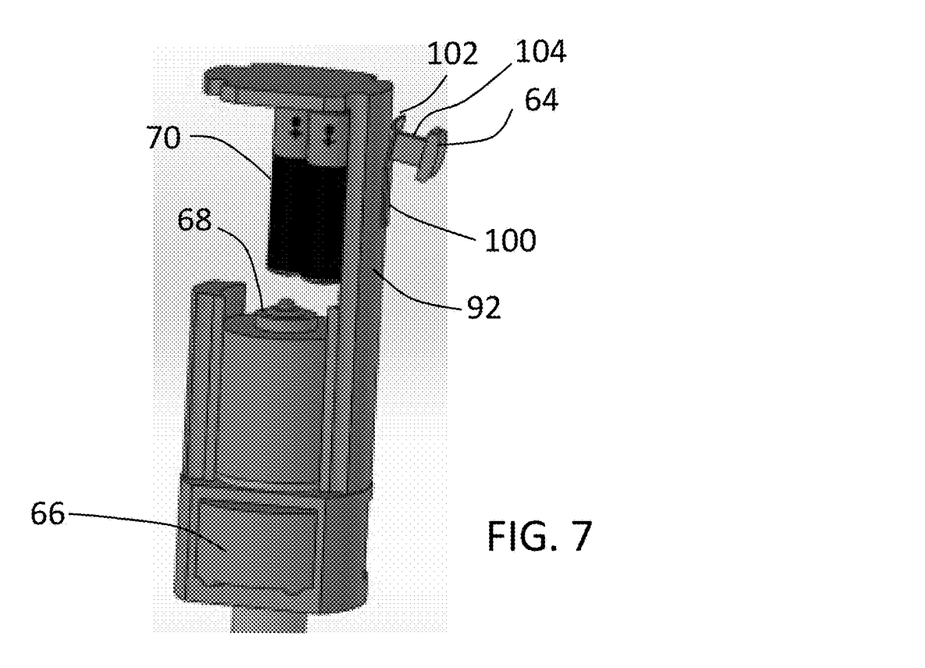
FIG. 7 is a partial perspective view of the drill assembly of FIG. 6.

The chuck 56 is a device that is well known in the art for removably attaching drill bits to a drill. The chuck 56 is attached to a gear box 66 that transfers rotary motion from a motor 68. A power source 70, such as a rechargeable battery for example, is electrically coupled to the motor 68. The gear box 66, motor 68 and energy source 70 are mounted within a frame 72. The frame 72 is sized to slidably fit within the interior portion 48. In the exemplary embodiment, the gear box 66 is a planetary gearing arrangement having a ring gear 74 and three planet gears 76 (FIG. 4A). The ring gear 74 is coupled to the housing 26 and is stationary. The planet gears 76 are mounted on a carriage 78 with a sun gear 75 disposed between the ring gear 74 and the planet gears 76. The sun gear 75 is mounted to shaft of motor 68. The carriage 78 includes three studs 80 (FIG. 4B) to mount the planet gears 76, the studs 80 extend from a first side 82. A shaft 84 extends from an opposite side, the shaft 84 being coupled to the chuck 56. It should be appreciated that the energizing of the motor 68 rotates the sun gear 75, which in turn rotates the planet gears 76 and thus the carriage 78.

Referring now to FIGS. 5-10, one embodiment of the drill portion 24 is shown. In this embodiment, the frame 72 is formed from a single integral member. The frame 72 includes a base 86 and a motor mount wall 88. The wall 88 is offset from the base 86 to allow the gear box 66 to be disposed therebetween. A side wall 90 extends from one side of the motor mount wall 88. A second side wall 92 extends from an opposite side of the motor mount wall 88. Both side walls 90, 92 have a curved inner surface 94, 96 that is sized and shaped to receive the motor 68. The second side wall extends axially past the end of the first side wall 90 and terminates at a top wall 98.

In one embodiment, the actuator 64 includes base member 100 (FIGS. 7-8) coupled to the second side wall 92. The base member 100 includes an end 102 that extends on an angle relative to the second side wall 92. The end 102 may be wider than the portion of the base member 100 that is coupled to the side wall 92. A projection 104 extends from the end 102 and connects that actuator 64 to the base member 100. The base member 100 may be made from a flexible material to allow the end 102 to bend in response to the user pressing on the actuator 64.

Figure 8:
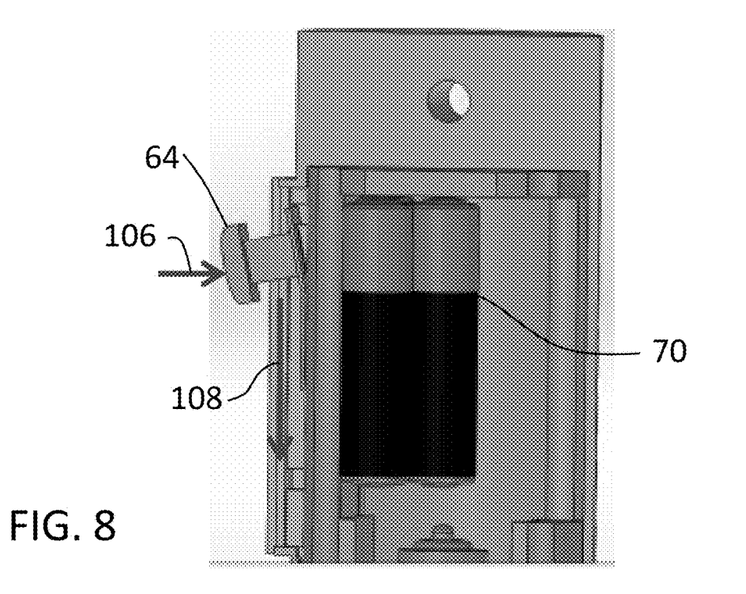
FIG. 8 is a partial side view of the drill assembly of FIG. 6.

To slide the drill portion 24 from the first position to the second position, the user first presses on the actuator 64 in the direction indicated by arrow 106 (FIG. 8). This causes the base member 100 to bend such that the end 102 moves within the slot 62 of the housing. In one embodiment, the end 102 is wider than the portion of the base member 100 attached to the side wall to prevent sliding of the drill portion when the actuator 64 is not depressed. It should be appreciated that the slot 62 may have a wider portion sized to allow the end 92 to extend therethrough and a narrower portion sized to allow the projection to move within the slot 62. Once the actuator 64 is depressed, the drill portion 24 is free to slide axially within the interior portion 48 in the direction indicated by arrow 108.

Figure 9:
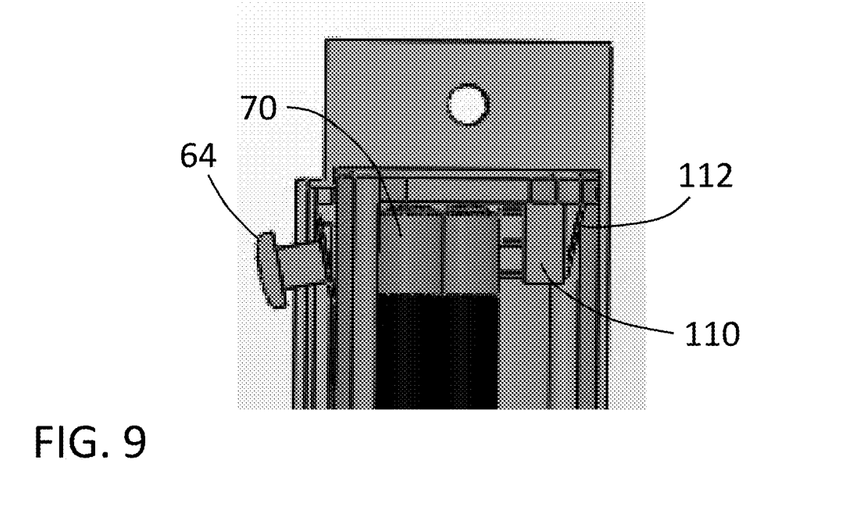
FIG. 9 is another partial side view of the drill assembly of FIG. 6.
Figure 10:
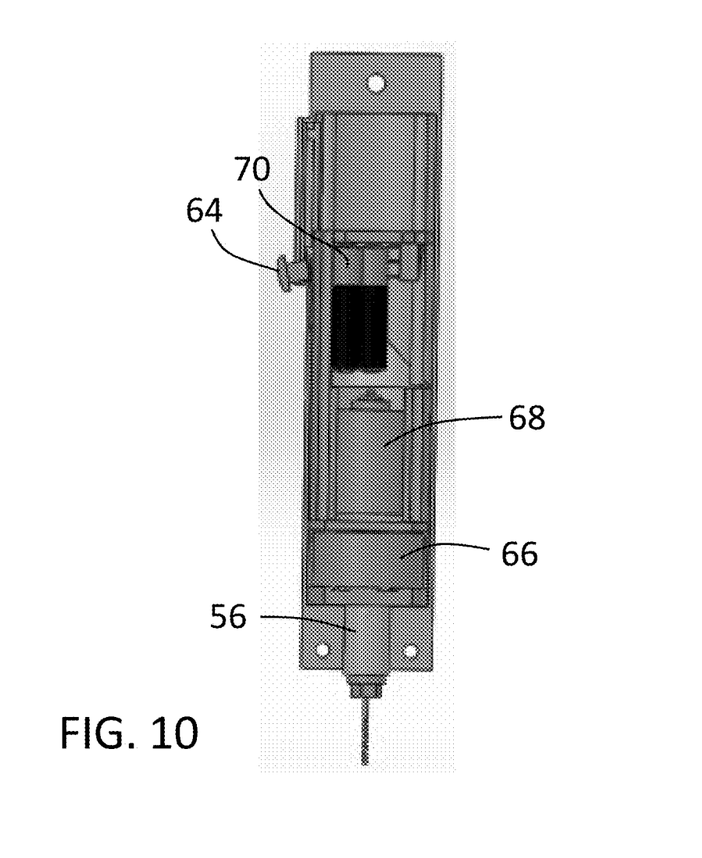
FIG. 10 is a side view of the drill assembly of FIG. 6.

In one embodiment a switch 110, such as a microswitch for example, is coupled to the frame 72. The switch 110 has an arm 112 that extends towards and contacts the surface of the interior portion 48. The arm 112 pivots in response to a force applied to its free end to actuate the switch 110. The switch 110 is electrically coupled between the energy source 70 and the motor 68 such that when the arm 112 actuates the switch 112, electrical current flows to the motor 68. In this embodiment, the surface of the interior portion 48 includes a cam surface that is offset to engage the arm 112 and actuate the switch 110. As a result, as the drill portion 24 slides within the interior portion 48, the arm 112 engages the cam surface to actuate the switch 110 and cause the automatic activation of the motor 68.

In another embodiment, the switch 110 is replaced with a switch arrangement on the bottom of the frame 72. In this embodiment, a spring, such as a helical compression spring is attached to the bottom 86 and is electrically coupled to the motor 68. A contact is electrically coupled to the power source 70 and is mounted to the wall 52 such that as the drill portion 24 is slide axially, the spring engages the contact forming a circuit to power the motor 68.

Figure 11:
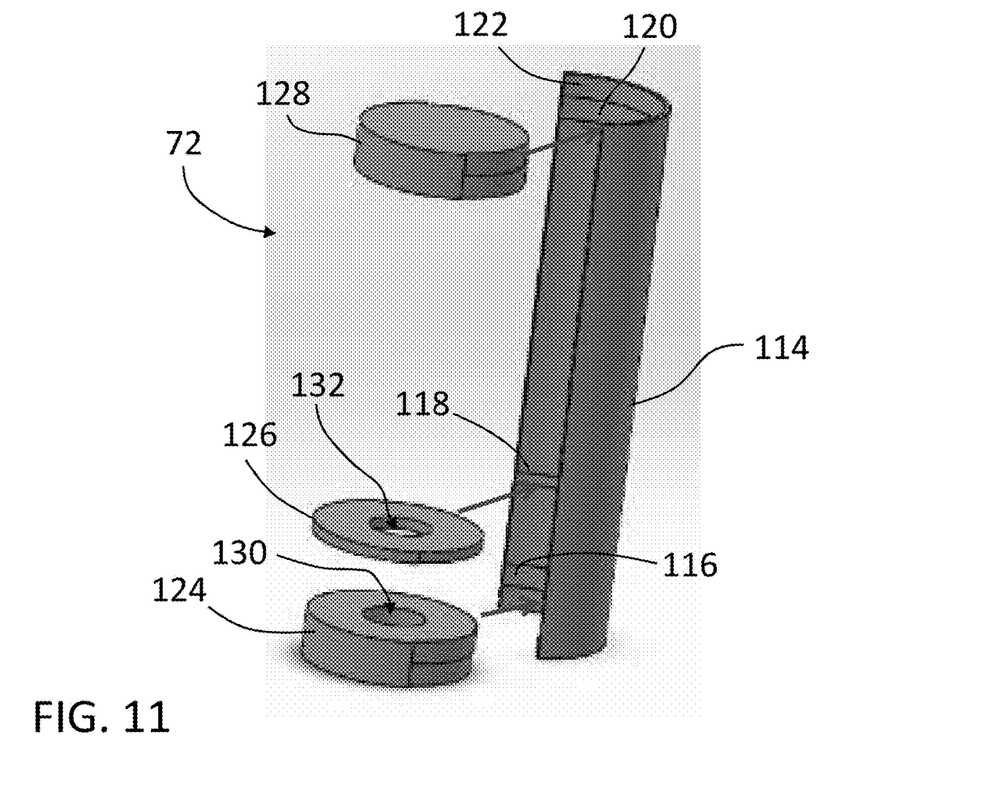
FIG. 11 is an exploded perspective view of a drill frame for use with the tool of FIG. 1 in accordance with another embodiment.
Figure 12:
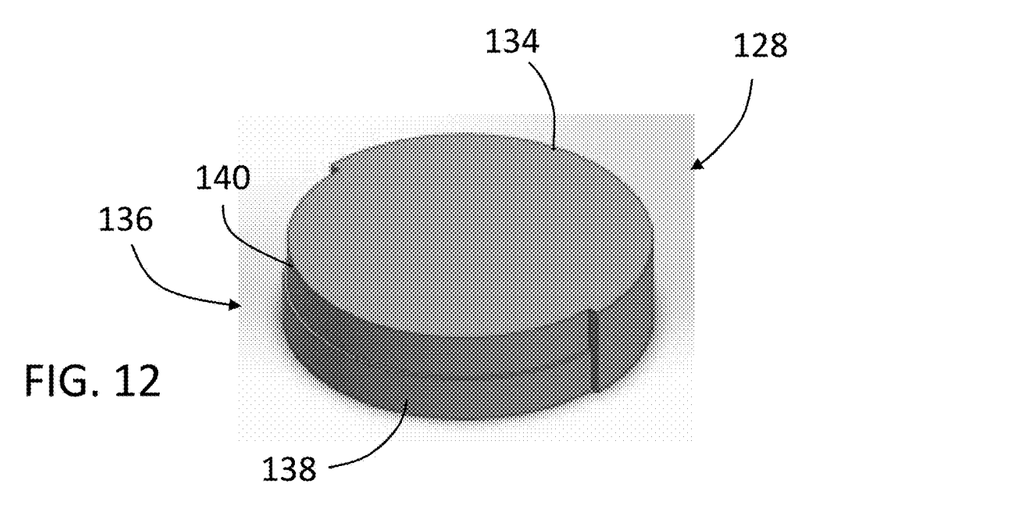
FIG. 12 is a perspective view of a spacer disk for use with the drill frame of FIG. 10.
Figure 13:
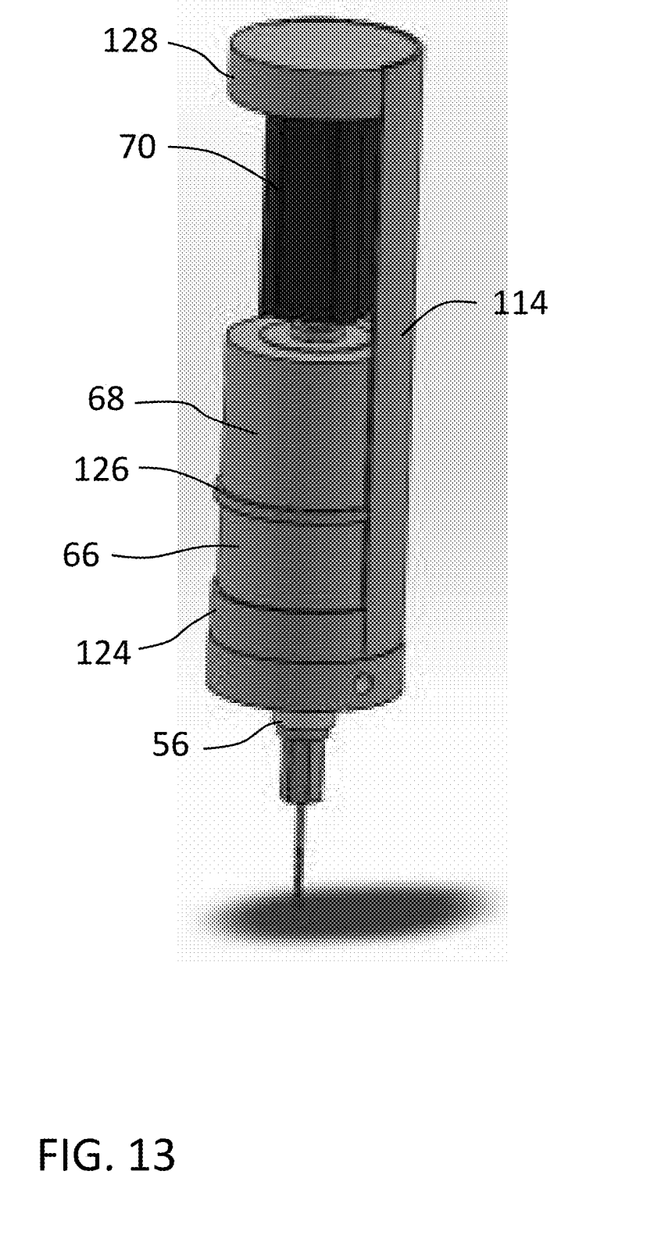
FIG. 13 is a perspective view of another drill assembly including the drill frame of FIG. 11.

Referring now to FIGS. 11-13, another embodiment of a drill portion 24 is shown having frame 72 formed from multiple members. In this embodiment, the frame 72 includes a body 114 having a semi-cylindrical shape. A plurality of grooves 116, 118, 120 are formed on the inner surface 122 of the body 114. The grooves 116, 118, 120 are sized to receive spacer members 124, 126, 128. Referring now to FIG. 12, the spacer member 128 will be described. It should be appreciated that the spacer members 124, 126 are similarly configured, with differences being in thickness and the inclusion of an opening 130, 132. The spacer member 128 includes a first side 134 having a first radius and a second side 136. In the exemplary embodiment, the second side has a first surface 138 having a second radius, the second radius being smaller than the first radius. The second side 136 further has a second surface 140 having a third radius, the third radius being smaller than the second radius. The first surface 138 being sized to be received in the groove 120, while the second surface has a radius sized to engage and cooperate with the body surface 122.

The spacer members are sized and positioned to allow mounting of the components 66, 68, 70 of the drill portion 24. The gear box 66 being positioned between the spacer member 124 and the spacer member 126. The motor being couples to the spacer member 126 and the spacer member 128 forming the top of the frame 72 to provide a mounting location for the energy source 70.

Figure 14:
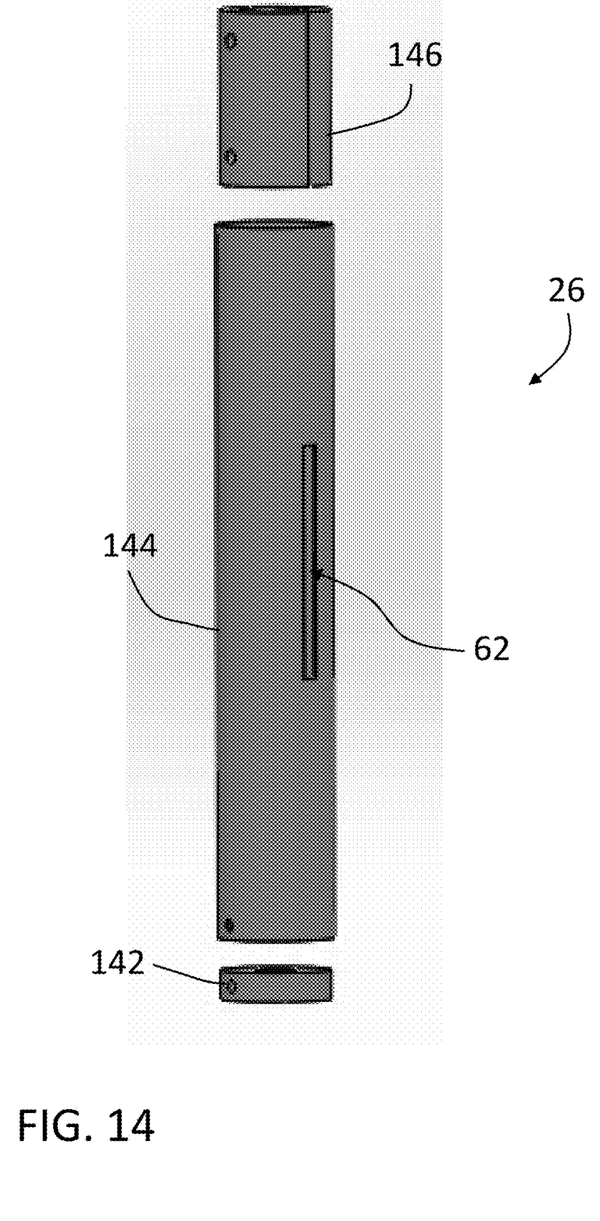
FIG. 14 is a side view of a tool housing in accordance with an embodiment of the invention.
Figure 15:
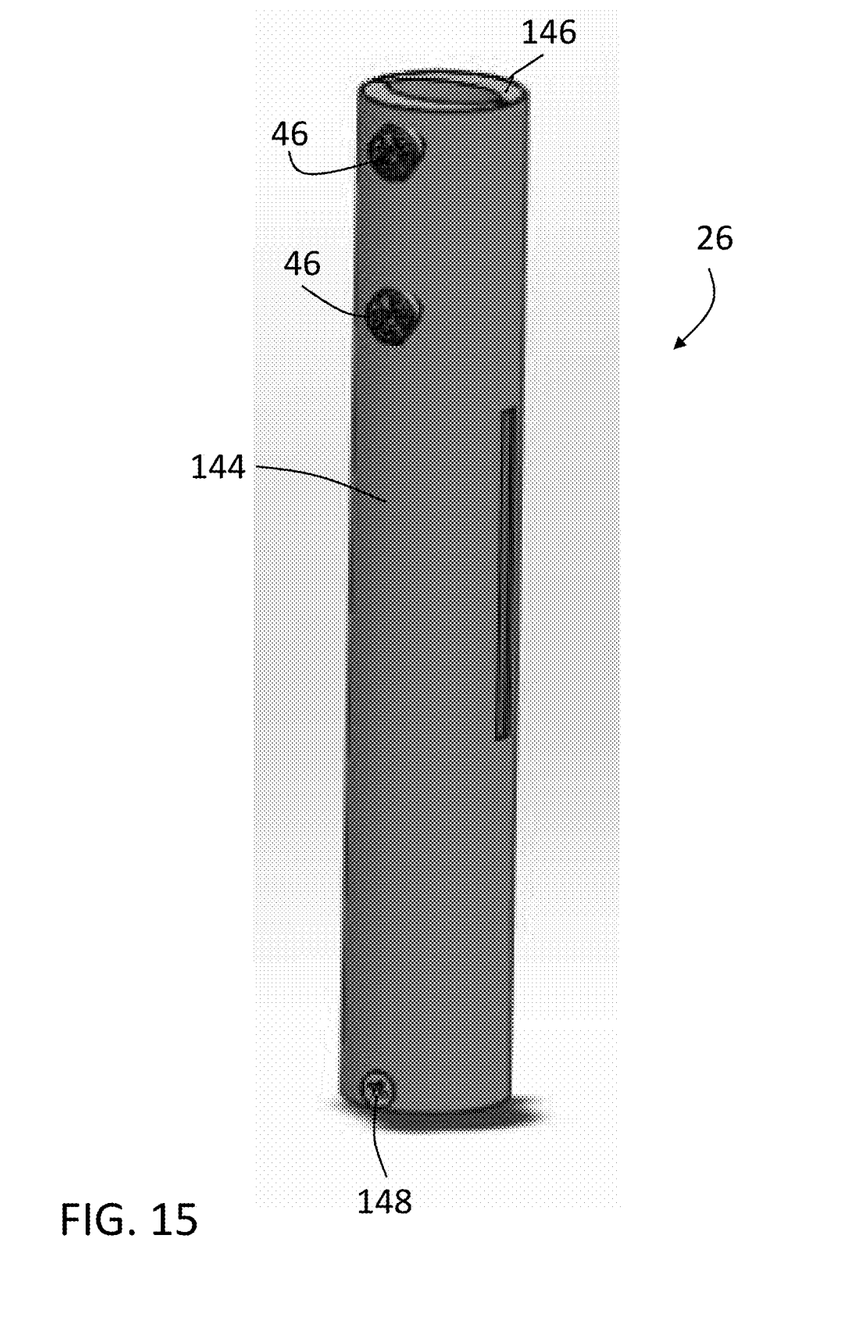
FIG. 15 is a perspective view of the tool housing of FIG. 14.
Figure 16:
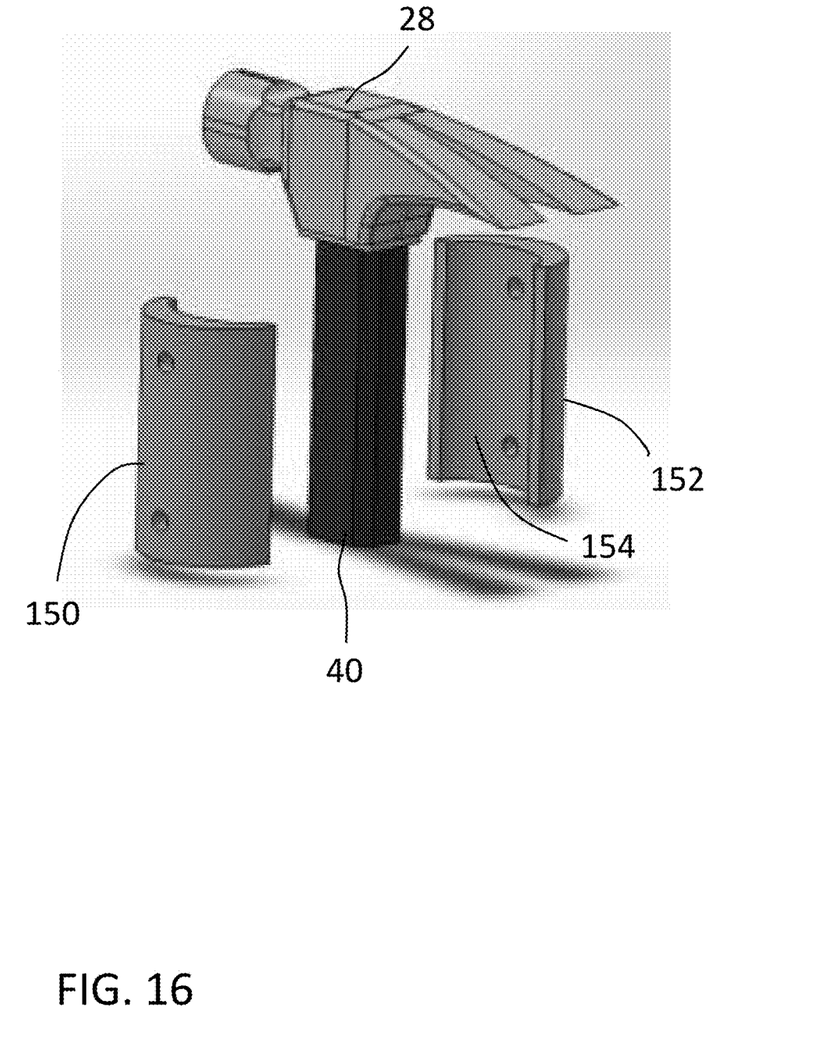
FIG. 16 is an exploded perspective view of a hammer portion of a tool for use with the tool housing of FIG. 14.

Referring now to FIGS. 14-16, an embodiment is shown of the housing 26. In this embodiment, the housing 26 is formed from three pieces, a bottom 142, a body 144 and a hammer shaft housing 146. The body 144 has a generally hollow interior portion having generally circular shape. The slot 62 is formed in the side wall. The bottom member 142 has a diameter sized to fit within the interior of the body 144. The bottom member 142 is secured to the body 144 by a fastener 148. The hammer shaft housing 146 includes a first half 150 and a second half 152. The halves 150, 152 each have a curved interior surface 154 that cooperate to capture the shaft 40 of hammer portion 22. The halves 150, 152 further have an outer diameter sized to be received within the interior portion of the body 144. The hammer shaft housing 146 and the shaft 40 are secured to the body 144 by a pair of fasteners 46.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A tool comprising:
   a housing having a first end and an opposing second end;
   a hammer portion extending from the first end, the hammer portion having at least one surface configured to strike a fastener in operation; and
   a drill portion slidably disposed within the housing, the drill portion including a chuck configured to receive a drill bit, the chuck being positioned within the housing when in a first position and at least partially extending from the second end when in a second position, wherein the drill portion further includes a motor operably coupled to rotate the chuck.

2. The tool of claim 1 wherein the drill portion further comprises an actuator extending through a slot in the housing, the drill portion moving from the first position to the second position in response to a user sliding the actuator within the slot.

3. The tool of claim 2 wherein the drill portion further comprises a frame slidably coupled to the housing, the frame having a semi-circular shape.

4. The tool of claim 3 wherein the frame includes a plurality of grooves, the grooves sized to receive a spacer member.

5. The tool of claim 4 wherein each spacer member includes a first side having a first radius and an opposing second side having a second radius, the second radius being smaller than the first radius.

6. The tool of claim 1 wherein the second end includes an opening having a diameter larger than the chuck.

7. tool comprising : a housing having a first end and an opposing second end; a hammer portion extending from the first end, the hammer portion having at least one surface configured to strike a fastener in operation; and a drill portion slidably disposed within the housing, the drill portion including a chuck configured to receive a drill bit, the chuck being positioned within the housing when in a first position and at least partially extending from the second end when in a second position; wherein the drill portion further comprises: a switch; an energy source electrically coupled to the switch; and a motor electrically coupled to the switch opposite the energy source; wherein the drill portion is configured to actuate the switch when the drill portion is moved from the first position to the second position.

8. The tool of claim 7 wherein the drill portion further comprises a gearbox coupled between the motor and the chuck.

9. The tool of claim 8 wherein the hammer portion consists of a head and a shaft, the shaft being at least partially disposed within the housing.

10. The tool of claim 8 wherein the gear box includes a planetary gear coupled between a ring gear and a sun gear, the sun gear coupled to the motor and three planet gears coupled to a carriage, the carriage being coupled to the chuck.

11. The tool of claim 7 wherein the motor is a 3.6 volt motor.

12. The tool of claim 7 wherein the switch is a microswitch, the microswitch having an arm configured to engage a protrusion in the housing when the drill portion is moved to the second position.

13. The tool of claim 7 wherein the switch includes a spring coupled to an end of the drill portion, the spring electrically coupled to the motor, and a contact member coupled to the second end, the contact member electrically coupled to the energy source.

14. The tool of claim 13 wherein the spring member contacts the contact member as the drill portion approaches the second position.

15. A tool comprising: a housing having a first end and an opposing second end; a hammer portion extending from the first end, the hammer portion having at least one surface configured to strike a fastener in operation; a drill portion slidably disposed within the housing, the drill portion including a chuck configured to receive a drill bit, the chuck being positioned within the housing when in a first position and at least partially extending from the second end when in a second position; wherein the drill portion further comprises an actuator extending through a slot in the housing, the drill portion moving from the first position to the second position in response to a user sliding the actuator within the slot; and wherein the actuator is movable in a direction generally perpendicular to a centerline of the housing, the actuator being configured to move towards the centerline before sliding axially along the housing.

* * * * *